United States Patent [19]
Clark et al.

[11] Patent Number: 5,296,805
[45] Date of Patent: Mar. 22, 1994

[54] SERVICEABLE WHEEL SPEED SENSOR WITH MAGNET ASSISTED RETENTION

[75] Inventors: Edward R. Clark, Monroeville; Jan Dubovec, Sandusky, both of Ohio

[73] Assignee: General Motors Corporation, Detroit, Mich.

[21] Appl. No.: 930,946

[22] Filed: Aug. 17, 1992

[51] Int. Cl.⁵ .................... G01P 3/488; F16C 32/00; B60T 8/72
[52] U.S. Cl. .................. 324/174; 188/181 R; 384/448
[58] Field of Search ............. 324/173, 174, 207.15, 324/207.25; 310/68 B, 168; 188/181 R; 384/446, 448

[56] References Cited

U.S. PATENT DOCUMENTS

| | | | |
|---|---|---|---|
| 3,473,120 | 10/1969 | Ruof | 324/70 |
| 3,910,386 | 10/1975 | Stigall et al. | 188/181 |
| 3,916,234 | 10/1975 | Stigall et al. | 310/155 |
| 4,904,936 | 2/1990 | Richmond | 324/174 |
| 4,988,220 | 1/1991 | Christiansen et al. | 384/448 |
| 5,004,358 | 4/1991 | Varvello et al. | 384/446 |
| 5,111,098 | 5/1992 | Peck et al. | 310/168 X |
| 5,140,261 | 8/1992 | Seo et al. | 324/173 |

*Primary Examiner*—Gerard R. Strecker
*Attorney, Agent, or Firm*—Patrick M. Griffin

[57] ABSTRACT

A serviceable ABS wheel speed sensor uses the permanent magnet both to provide an efficient magnetic circuit and to provide part of the retention force that retains a stator subassembly and a sensor subassembly together. The stator subassembly is a plastic end cap that seals one end of the wheel bearing, and has an annular steel web molded into it. A permanent magnet is located behind the web. The sensor subassembly is a plastic plug that fits into the end cap, and has a sensor coil with a steel plate in front abuttable with the stator subassembly web. When the two are assembled, the web and plate are pulled and retained together by the magnet. The coil and magnet are also thereby located proximate to spinning exciter teeth on one of the bearing races to provide an efficient magnetic circuit and strong signal.

3 Claims, 2 Drawing Sheets

SERVICEABLE WHEEL SPEED SENSOR WITH MAGNET ASSISTED RETENTION

This invention relates to serviceable vehicle wheel speed sensors in general, and specifically to such a sensor in which the permanent magnet is specially placed so as to cooperate in the retention of the sensor as well as to provide a magnetic flux field.

BACKGROUND OF THE INVENTION

Vehicle wheel speed sensor assemblies used in conjunction with a vehicle anti-lock braking system often protect the sensor coil and magnet from the elements by enclosing them within a bearing seal or end cap. Occasionally, however, the sensor needs to be removed and serviced, which necessitates removing the seal and exposing the interior of the bearing. Therefore, a new type of sensor assembly has been proposed in which the sensor can be removed for service without breaking the bearing seal. As disclosed in coassigned U.S. Pat. No. 4,988,220 to Christiansen et al, the sensor (48) consists of a coil and magnet that are protected by being molded together into a water tight ring shaped housing (54), which in turn press fits removably over a seal casing. Specifically, the housing (54) press fits over a rubber sleeve (42) molded over the outside of seal casing (28). The same rubber sleeve (42) that retains the sensor (48) also covers slots (38) that are cut into the steel seal casing (28). Therefore, removal of the sensor (48) does not break the bearing seal.

The only drawback of the serviceable design described above is that the same rubber sleeve and plastic housing that provide protection and removability also serve to magnetically insulate the exciter ring from the magnet and coil. This can reduce the strength and efficiency of the system, just as insulation would in an electrical circuit or a heat conduction path. A stronger magnet would have to be used to overcome the resistance. Also, the sleeve (42) has a lip (44) which, while it retains the sensor (48) securely, could potentially be damaged during its removal.

SUMMARY OF THE INVENTION

The invention provides a serviceable wheel speed sensor in which the magnet and coil are not only located more efficiently from an electro-magnetic standpoint, but in which the magnet actually cooperates in physically, removably retaining the various components of the sensor.

In the preferred embodiment disclosed, the invention is incorporated in a vehicle wheel bearing that has a rotating center spindle surrounded by a stationary, cylindrical hub. The end of the spindle has an exciter ring with an axially extending cylindrical array of teeth secured thereto.

The wheel speed sensor of the invention includes two subassemblies, a stator subassembly secured to the stationary hub, and a sensor subassembly that is removably secured to the stator subassembly. The stator subassembly includes a seal portion in the form of a stepped cylindrical end cap that surrounds the exciter ring, and which completely covers space between the spindle and hub. Molded integrally into the plastic end cap, and covered by a very thin layer of plastic, is a stamped steel stator. The stator has a cylindrical array of teeth of its own, located coaxial to the exciter ring, and a flat surface that serves as a magnetic clamp, behind which an annular permanent magnet is secured. The sensor subassembly is a molded plastic plug that press fits into the center of the end cap, and which supports a sensor coil covered by a thin steel ring that also serves as a magnetic clamp.

When the plug is pressed into the end cap, the two magnetic clamps axially abut, putting the magnet to both sets of inter-rotating teeth. This establishes a close and efficient magnetic circuit. In addition, the magnet serves to pull the two magnetic clamps tightly together, assisting the retention of the plug within the end cap. A stronger magnet works to double advantage, increasing both the sensor efficiency and the physical security of the system. Removal of the plug requires breaking of the magnetic clamping force, but involves less physical stressing of mechanical parts.

DESCRIPTION OF THE PREFERRED EMBODIMENT

Figure 1:
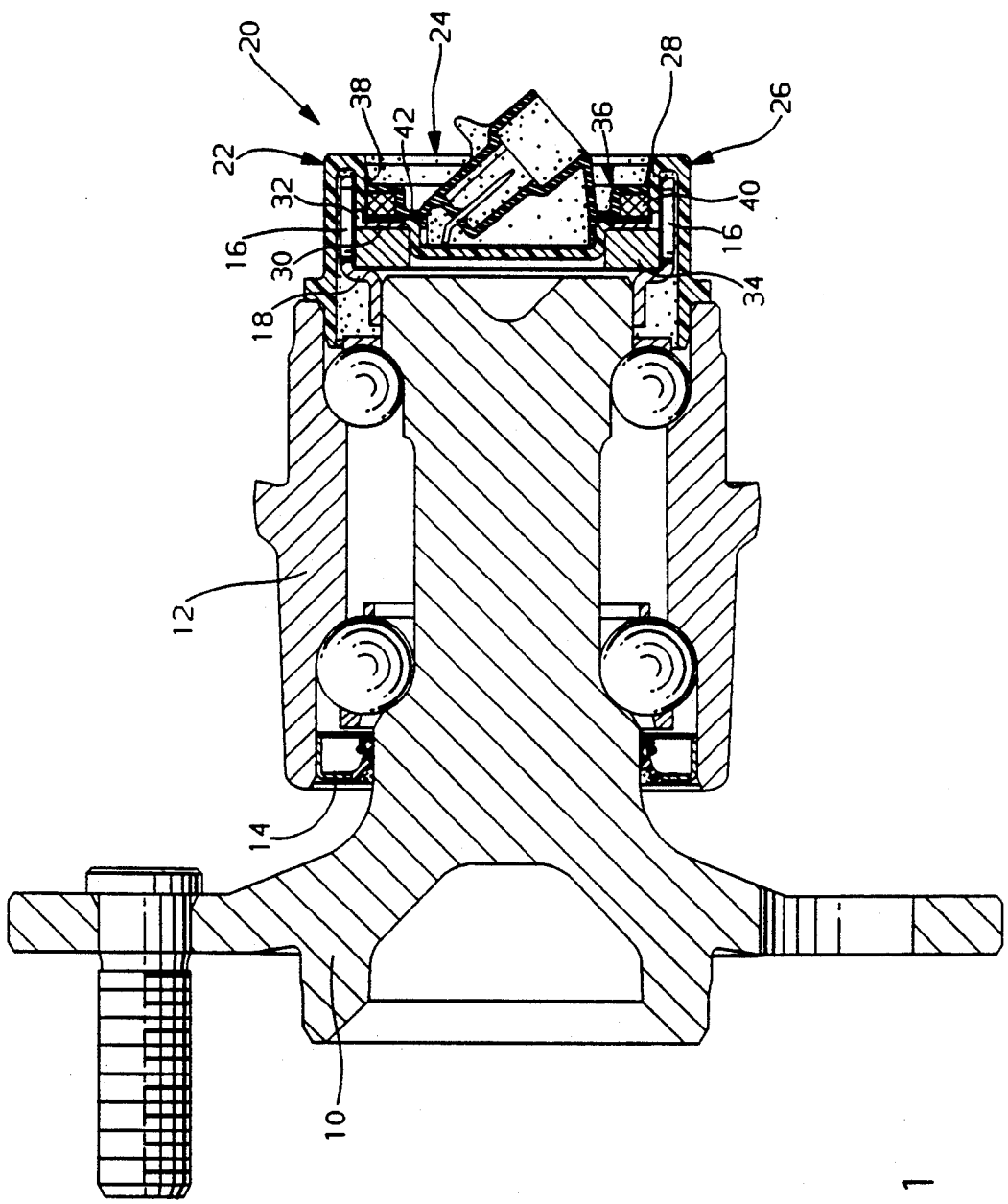
FIG. 1 is a cross section of a vehicle wheel bearing incorporating the speed sensor assembly of the invention.

Referring first to FIG. 1, a vehicle wheel bearing of the nondrive or trailing type includes a solid rotating spindle (10) surrounded by a cylindrical hub (12), which would be fixed to the vehicle suspension. Spindle (10) and hub (12) define an intermediate annular space, one end of which is sealed by a conventional rubbing seal (14). The free end of spindle (10) and one edge of hub (12) are substantially flush, defining the other end of the annular space. The free end of spindle (10) also mounts a cylindrical array of axially extending exciter ring teeth (16), which are part of a steel stamping that includes an annular shoulder (18) that is generally normal to the axis of spindle (10). The exciter ring teeth (16), spinning with spindle (10), act to rapidly break the flux lines established by a magnetic circuit, the sensed fluctuations in which correspond to the speed of spindle (10) and a non-illustrated wheel attached thereto. The sensor assembly of the invention, a preferred embodiment of which is indicated generally at (20), provides multiple functions, including sealing, covering and protecting exciter ring teeth (16), establishing the magnetic circuit, and also provides a measure of self-retention.

Figure 2:
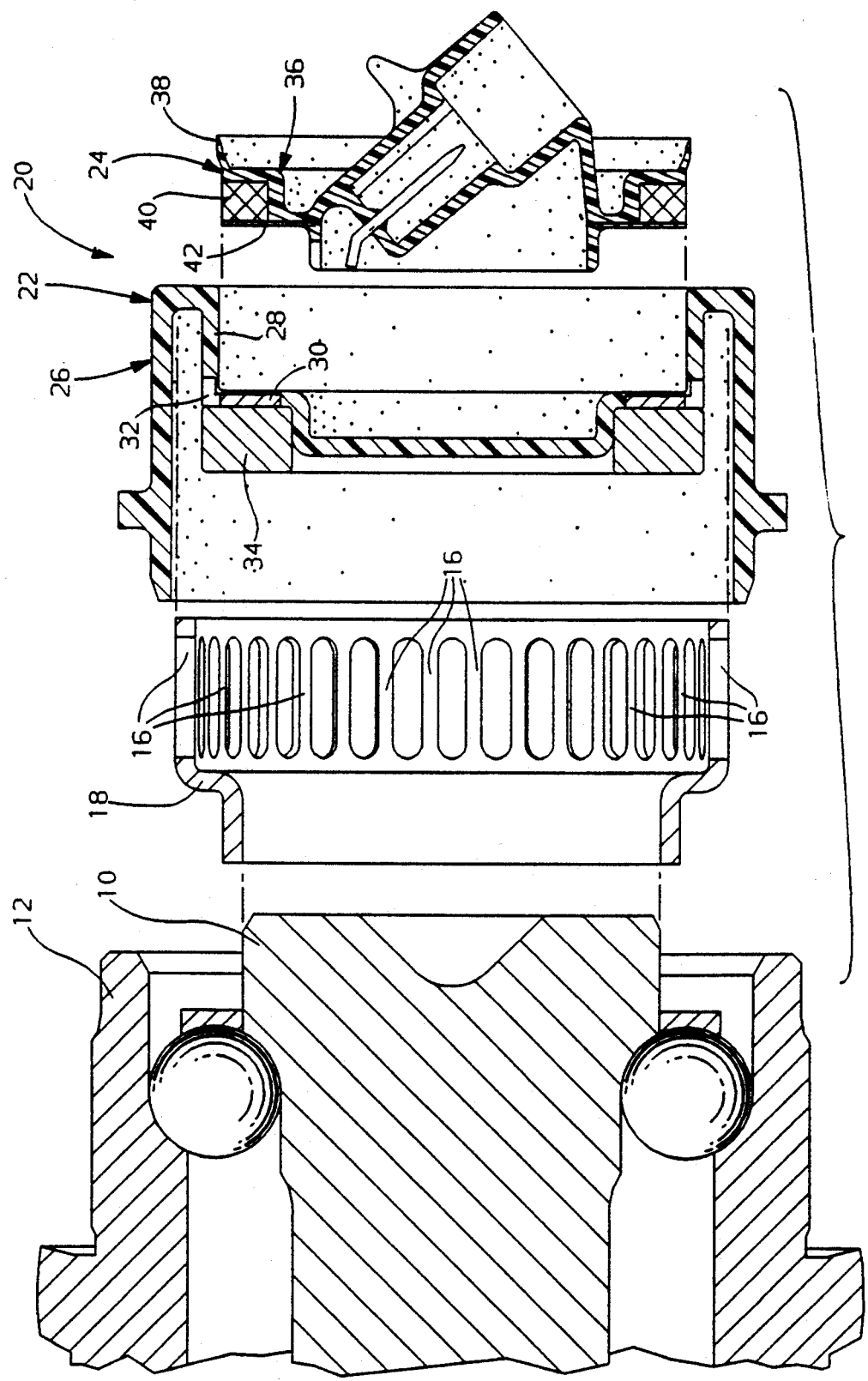
FIG. 2 is an enlargement of the end of the bearing showing the various components axially aligned and removed.

Referring next to FIG. 2, the wheel speed sensor (20) includes two basic subassemblies, a stator subassembly indicated generally at (22), so called because it is secured to static hub (12), and a sensor subassembly indicated generally at (24), which is removably attached to the stator subassembly (22). The stator subassembly (22) includes a molded plastic end cap (26) in the form of a stepped cylinder with a central tunnel (28) which has a concave outer surface, facing axially outwardly of hub 12, and a convex inner surface facing axially inwardly of hub 12. Molded integrally into the plastic end cap (26) is a stamped steel stator comprising a flat web (30) that is coaxial to the central tunnel (28) and from which a series of short teeth (32) axially extend in a cylindrical array, at a diameter that puts them just radially inboard of and coaxial to the exciter ring teeth (16). The short teeth (32) and the outer surface of web (30) are covered by a thin layer of the plastic material from which end cap (26) is molded, while the inner surface is bare. Therefore, end cap (26) is capable alone of providing a complete seal. Press fitted over the inner surface of central tunnel (28), and abutted with the bare back surface of stator web (30), is a powerful ring shaped permanent magnet (34), which has the same outer diameter as the stator teeth (32). Sensor subassembly (24) includes a molded plastic plug (36), which has a flexible outer lip (38) that press fits tightly into the concave outer surface of end cap tunnel (28). Plug (36) provides a support for a ring-shaped sensor coil (40), generally of copper wire, which is located just radially inboard of lip (38). Secured to plug (36) just axially inboard of coil (40) is a thin steel plate (42), coaxial to stator web (30).

Referring again to FIG. 1, it may be seen how the particular size and location of the components described above create an easy to assemble, serviceable design in which magnet (34) provides multiple functions. After the exciter ring teeth (16) have been secured to the end of spindle (10), the stator subassembly (22) is installed by pushing plastic end cap (26) tightly into hub (12). This seals the right hand end of the annular space between hub (12) and spindle (10) completely. Magnet (34) is located axially close to, but not touching, shoulder (18), and is also closely radially spaced from, but not touching, teeth (16), so there is no rubbing friction or wear. Magnet (34) is secured to end cap (26) strongly enough that it will not draw itself away and into shoulder (18). Next, the sensor subassembly (24) is added simply by pushing plug (36) inside of the concave outer surface of end cap central tunnel (28) until steel plate (42) abuts web (30), specifically, the thin plastic layer that covers web (30). As the plug lip 38 moves axially inside subassembly 24 are assured of being coaxial to one another, and maintained in a coaxial orientation by that axially interfitting relationship. The magnet (34) assists this process, by pulling steel plate (42) in.

Still referring to FIG. 2, in the completed sensor (20), the magnet (34) is located between and near both sets of teeth (16) and (32), and the shorter teeth (32) are approximately centered relative to the longer teeth (16). The compressed plug lip (38) seals coil (40) from the elements, and also provides part of the retention force that keeps plug (36) in place. Extra retention force is provided by magnet (34) pulling steel plate (42) into and against web (30), which act as magnetic clamps against one another, separated only by the thin molded plastic layer. Therefore, lip (38) need not grab the concave outer surface of end cap tunnel (28) so strongly as to be damaged when and if plug (36) is pulled out. Breaking the magnetic clamp causes no physical damage. Magnet (34) also provides the traditional function that the permanent magnet does in any passive, variable reluctance wheel speed sensor, which is to provide a flux field through a set of spinning magnetic teeth like (16). Here, the same proximity of magnet (34) to web (30) and plate (42) that provides magnetic clamping also provides a strong flux field through the counter spinning teeth (32) and (16), which makes for a strong, distinct signal. The extra cost of a stronger magnet can be justified in the disclosed design because it yields a double return, a stronger signal coupled with a stronger, but removable, retention.

Other sensor embodiments could be made that would provide the same advantages. For example, the magnet (34) could be part of the sensor subassembly (24), rather than part of the stator subassembly (22), secured in front of coil (40). Then, magnet (34) could act as its own clamp, pulling itself and plug (36) into and against web (30), and eliminating the steel plate (42). If spindle (10) were part of a drive wheel bearing, and so hollow rather than solid, then a rubbing seal would have to be provided, rather than the non-rubbing end cap (26). Even so, the casing of a rubbing seal could contain a magnetic clamping portion like web (30) to abut, or be abutted by, a magnet.

Wherever the magnet 34 is located, the stator subassembly 22 and sensor subassembly should be designed to axially interfit, that is, designed, as are plug 36 and end cap central tunnel 28 to fit within or over one another in such a way as to be radially confined and kept concentric or coaxial to one another. A mere axial abutment of the two, without radial guidance and confinement, would not be practical. Therefore, it will be understood that it is not intended to limit the invention to just the embodiment disclosed.

The embodiments of the invention in which an exclusive property or privilege is claimed are defined as follows:

1. For use in a vehicle wheel bearing having a stationary bearing race and a coaxial rotating race forming an annular space therebetween, in which said rotating race has an exciter ring secured thereto including a cylindrical array of magnetic material teeth, an improved serviceable seal and speed sensor assembly, comprising, a stator subassembly including a seal portion fixed to said stationary bearing race and covering said annular space, said stator subassembly further including a magnetic clamping portion proximate said teeth, a sensor subassembly including a speed sensor and a speed sensor support adapted to interfit axially with said stator subassembly so as to locate said speed sensor proximate said exciter ring teeth, and also having a magnetic clamping portion abuttable with said stator subassembly clamping portion, and, a permanent magnet secured to one of said stator and sensor subassemblies in abutment with said abutted magnetic clamping portions, whereby said magnet is proximate to both said speed sensor and exciter ring teeth, so as to provide magnetic flux therefor, and also serves to magnetically retain said stator and sensor subassembly clamping portions together and thereby retain said subassemblies together.

2. For use in a vehicle wheel bearing having a stationary bearing race and a coaxial rotating race forming an annular space therebetween, in which said rotating race has an exciter ring secured thereto including an axially extending cylindrical array of magnetic material teeth, an improved serviceable seal and speed sensor assembly, comprising, a stator subassembly including a seal portion fixed to said stationary bearing race and covering said annular space, said stator subassembly further including a magnetic clamping portion proximate said teeth and a permanent magnet secured thereto in axial abutment with said stator magnetic clamping portion, and, a sensor subassembly including a speed sensor and a speed sensor support adapted to interfit axially with said stator subassembly so as to locate said speed sensor proximate said exciter ring teeth, and also having a magnetic clamping portion axially abuttable with said stator subassembly clamping portion, whereby said sensor assembly is pulled axially toward said stator assembly by said magnet as said clamping portions move into abutment, which magnet is thereby located proximate to both said speed sensor and exciter ring teeth so as to efficiently provide magnetic flux therefor.

3. For use in a vehicle wheel bearing having a stationary bearing race and a coaxial rotating race forming an annular space therebetween, in which said rotating race has an exciter ring secured thereto including an axially extending cylindrical array of magnetic material teeth, an improved serviceable seal and speed sensor assembly, comprising,
- a stator subassembly including an end cap fixed to said stationary bearing race and covering said annular space, said end cap further including an annular magnetic material web integral thereto and proximate said teeth with a permanent magnet secured thereto behind said web, and,
- a sensor subassembly including a speed sensor coil and a coil support adapted to interfit axially with said stator subassembly so as to locate said speed sensor coil proximate said exciter ring teeth, and also having a magnetic plate axially abuttable with said stator subassembly web, whereby, as said sensor subassembly is interfitted with said stator subassembly said web and plate are pulled together by said magnet, which magnet is thereby located proximate to both said speed sensor coil and exciter ring teeth so as to efficiently provide magnetic flux therefor.

* * * * *